J. R. LUCE.
Saw-Teeth.

No. 151,407. Patented May 26, 1874.

WITNESSES.
Henry N. Miller
C. L. Evert.

INVENTOR
James R. Luce.
Alexander Mason
By
Attorneys.

UNITED STATES PATENT OFFICE.

JAMES ROOT LUCE, OF STEVENS POINT, WISCONSIN.

IMPROVEMENT IN SAW-TEETH.

Specification forming part of Letters Patent No. 151,407, dated May 26, 1874; application filed November 6, 1873.

*To all whom it may concern:*

Be it known that I, JAMES R. LUCE, of Stevens Point, in the county of Portage and in the State of Wisconsin, have invented certain new and useful Improvements in Saw-Teeth; and do hereby declare, that the following is a full, clear, and exact description thereof, reference being had to the accompanying drawings and to the letters of reference marked thereon, making a part of this specification.

My invention relates to that class of saw-teeth which are provided with removable cutting-teeth; and it consists in the means for holding the tooth in the plate, as will be hereinafter more fully set forth.

In order to enable others skilled in the art to which my invention appertains to make and use the same, I will now proceed to describe its construction and operation, referring to the annexed drawing, in which—

Figure 1:
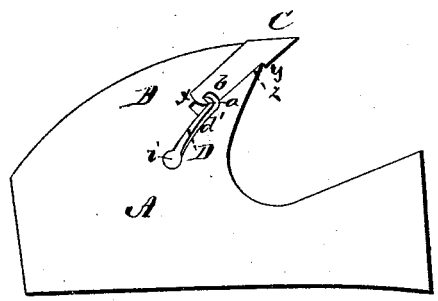
Figure 2:
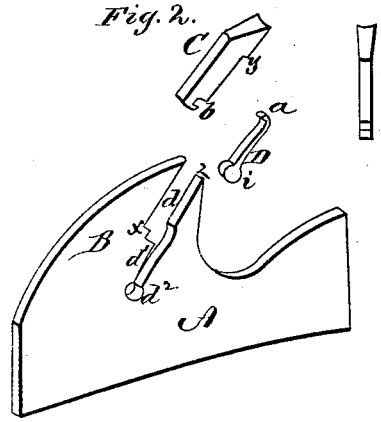

Figure 1 is a side view of a part of a circular saw with a plate having a removable cutting-tooth embodying my invention; and Fig. 2 shows the various parts detached, in perspective.

A B represent a part of a circular saw-plate, formed in any of the known and usual ways. C represents the cutting-tooth, constructed substantially in the manner shown in the drawing, to be inserted in a slot, $d$, in the plate. In the edges of the tooth C are made curved or V-shaped grooves to fit over the correspondingly-shaped edges of the slot $d$, so that when the tooth is pressed down in the slot it cannot come out sidewise. The butt of the cutting-tooth C rests against a shoulder, $f$, formed in the bottom of the slot $d$. In the under side of the tooth, a suitable distance from the outer end, is formed a shoulder, $y$, which, when the tooth is inserted, rests against a point, $z$, on the saw-tooth. The cutting-tooth C is thus firmly supported in the saw-plate B, and it is held there by the following means: From the bottom or lower end of the slot $d$ extends another slot, $d^1$, farther into the saw-plate, and the lower end $d^2$ of this slot is made round or circular, as shown in Fig. 2. D represents a spring, the outer end of which forms a hook, $a$, and the inner end forms a rivet, $i$. This spring is inserted in the slot $d^1$, with the rivet $i$ passing through the enlarged part $d^2$ of the said slot, where it is firmly riveted to the saw-tooth. When the cutting-point C is inserted in the slot $d$ and pressed down, the hook $a$ springs into a notch, $b$, made in the cutting-point, and holds it firmly in its place.

To remove the tooth the hook $a$ is sprung, by means of any suitable instrument, out of the notch $b$, when the point can readily be pulled out.

Having thus fully described my invention, what I claim, and desire to secure by Letters Patent, is—

The combination of the saw-plate A B, having slots $d$ $d^1$, shoulder $x$, and point $z$, the removable cutting-tooth C, having notch $b$ and shoulder $y$, and the spring D, with hook $a$ and rivet $i$, all constructed substantially as and for the purposes herein set forth.

In testimony that I claim the foregoing I have hereunto set my hand this 20th day of October, 1873.

JAMES ROOT LUCE.

Witnesses:
   A. N. MARR,
   JAMES A. FELCH.